3,582,381
PROCESS FOR CONVERTING ARYL PARAROSANI-
LINE SULFONIC ACID DYESTUFFS INTO
PIGMENTS
Theodor Papenfuss, Niederhofheim, Taunus, Heinz
Rentél, Schonberg, Taunus, and Ernst Spietschka,
Oberauroff, Taunus, Germany, assignors to Farbwerke
Hoechst Aktiengesellschaft vormals Meister Lucius &
Bruning, Frankfurt am Main, Germany
No Drawing. Filed Aug. 2, 1968, Ser. No. 749,566
Claims priority, application Germany, Aug. 12, 1967,
P 15 92 876.4
Int. Cl. C09c 3/02
U.S. Cl. 106—288Q
5 Claims

ABSTRACT OF THE DISCLOSURE

A process for converting aryl-pararosaniline sulfonic acid dyestuffs into pigments having high tinctorial strength and soft grain and being easily dispersible, in which process aqueous suspensions of said dyestuffs are treated with aqueous emulsions of vehicles at elevated temperature and the pigments are recovered.

---

The present invention relates to a process for converting dyestuffs of the aryl-pararosaniline sulfonic acid series into pigments having a high tinctorial strength and a soft grain.

It is known that it is not possible to convert the aqueous pastes of pigments of the aryl-pararosaniline sulfonic acid series of the general composition

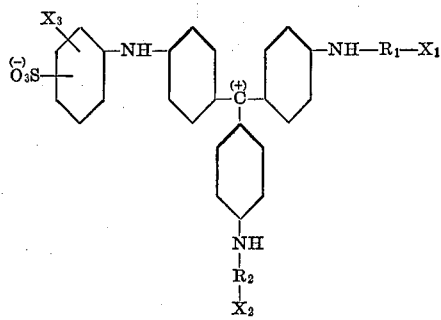

in which $R_1$ and $R_2$ are direct linkages or represent arylene radicals, $X_1$, $X_2$ and $X_3$ each represents a hydrogen or halogen atom or an alkyl-, alkoxy or nitro group, into useful pigment powders having a high tinctorial strength, by means of a technical drying process.

Owing to their pronounced hydrophilic property the moist press cake of these dyestuffs dry to form hard agglomerates that cannot be disintegrated by the normal mechanical stress exerted by grinding them on a three-roller mill in order to produce the corresponding printing pastes. Therefore, the dried dyestuffs as such are unsuitable for use in printing dyestuffs.

These difficulties have been disclosed in numerous publications [cf. E. K. Fischer, Am. Ink Maker 23 (1945), No. 12; U.S. Pat. No. 2,153,515; German Pat. No. 390,-812; Kittel, "Pigmente," page 569].

If the specified dyestuffs are to be used as pigments, it is, however, necessary to dry them. Several methods have, therefore, been described in order to avoid the difficulties in drying. The most common method is the so-called Flush process which provides water-free Flush pastes of the used dyestuff pigments in linseed oil, having a dyestuff content of about 40%, by mixing the aqueous pigment pastes with linseed oil varnishes. This process, however, requires a high technical expenditure. Its disadvantages reside, above all, in having to use large-size kneading machines that work discontinuously and are exposed to a heavy wear and tear. Moreover, the properties of the linseed oil varnish used, the proportion of which is about 60% by weight of the Flush paste obtained, cannot be harmonized with the compatibility with the printing varnishes and additives used for the preparation of printing pastes.

We have now found that aryl-pararosaniline sulfonic acids of the general formula

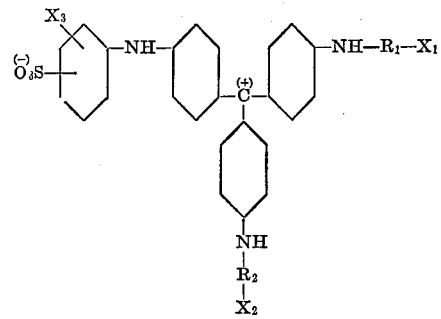

in which $R_1$ and $R_2$ are direct covalent linkages or represent arylene radicals, especially phenylene- or naphthylene radicals, $X_1$, $X_2$ and $X_3$ each represents a hydrogen, chlorine or bromine atom, a nitro- or a sulfonamide group, or an alkyl or alkoxy group having 1 to 3 carbon atoms, $X_1$ and $X_2$ being hydrogen atoms only if $R_1$ and $R_2$ are direct covalent linkages, respectfully can be converted into easily dispersible pigments having high tinctorial strength and soft grain by adding an aqueous emulsion of vehicles of vegetable, animal or synthetic origin to the aqueous suspensions of pigments of the above formula, prepared by known methods and obtained by adding a mineral acid to the aqueous alkaline solutions of the specified dyestuffs, at temperatures in the range of from about 60° to about 100°, preferably from about 80° to about 90° C., and then stirring the whole intimately, generally, for 5 minutes to 1 hour, preferably for 15 to 30 minutes. The work-up is advantageously carried out by suction-filtering the pigments, washing them with water and finally drying them at temperatures below 100° C., preferably in the range of from about 50° to about 70° C. Appropriate aqueous emulsions to be used according to the invention are, for example, aqueous emulsions of drying and/or non-drying oils, for example linseed oils, wood oils, soy-bean oils, cotton seed oils, tall oils, peanut oils, fish oils, castor oils and ricinene oils, spindle oils and poly-oils; unrefined, bodied or blown linseed oils or fish oils or mixtures thereof being preferred. Emulsions of resin varnishes are likewise suitable for this purpose. By resin varnishes there are to be understood solutions of natural and/or synthetic resins and other natural or synthetic film-forming agents in mineral oils, synthetic or vegetable oils and mixtures thereof. In this case, the above-mentioned oils or resin varnishes may be partially or completely replaced by fine-cut mineral oils boiling between about 200° and about 400° C., depending on the intended use of the pigments.

As emulsifiers for these aqueous emulsions there may be used anionic or non-ionogenic products; examples of anion-active compounds are carboxylates, such as sodium palmitate, Marseilles soap, salts of acrylation products of aminocarboxylic acids and sarcosides acylated with fatty acids; sulfates such as salts of sulfated castor oils, sulfated carboxylic acid esters or -amides, primary and secondary fat alcohol sulfates having 12 to 18 carbon atoms, sulfates of alkylated polyalcohols which may, in addition, be esterified or etherified, and their substitution products and sulfates of acylated alkanolamines; sulfonates, for example of fatty acids, the esters and amides thereof and of fat alcohols, ethers and nitriles, primary and secondary alkylsulfonic acids, sulfonates having ester-, ether- or amide-like linkages, sulfonates of polycarboxylic acid esters and amides and aromatic and hydro-aromatic sulfonic acids having a low molecular weight, aryl- and alkylaryl-sulfonic acids and the derivatives thereof, sulfamic acids of higher molecular weight and the salts thereof and sulfinic acids of higher molecular weight and the salts thereof. As non-ionogenic compounds there may be mentioned substituted polyalcohols, tensides on the basis of mono- and polysaccharide, acetylene glycols of higher molecular weight, alkylene oxides of higher molecular weight, substituted polyglycol ethers (ethylene oxide adducts), such as alkyl-polyglycol ether, alkylphenyl-polyglycol ether and acyl-polyglycol ether having 12 to 18 carbon atoms in the alkyl radical, oxethylated fatty amines and sulfates of substituted polyglycol ethers.

The aqueous emulsions are added in such an amount that 100 parts by weight of the final dyestuff powder contain advantageously about 10 to 50 parts by weight of anhydrous vehicles.

The process of the present invention provides pigments having a dyestuff content of up to about 80 to 90%, which can extremely easily be distributed in the vehicles commonly used in the printing dyestuff industry and, therefore, furnish prints in a much higher yield than those dried by normal methods. The advantage obtained can be ascertained by determining the hardness or softness of grain in such a manner as to count the passages through the three-roller mill necessary to achieve a particles size of 5 microns. The Flush method described in the literature for preparing pigments cannot be applied to the dyestuff class of the present invention since this class concerns hydrophilic pigments containing sulfonic acid groups, that react as inner salts with cation-active wetting agents while splitting up their structure. The result is a considerable loss in tinctorial strength. Moreover, they are extremely sensitive to the solvent specified in the cited literature, a small percentage of solvent being already effective. This sensitivity is again reflected by a very much pronounced decreased in tinctorial strength.

It is particularly advantageous to carry out the process of the present invention in a continuous manner.

The use of said powders instead of Flush pastes in the printing dyestuff industry represents a technical advantage insofar as the powders can be processed with any vehicle into printing dyestuffs to be used in the offset or intaglio printing and they are, therefore, suitable for general use.

Further advantages over the Flush pastes reside in the possibility of handling them more easily, dosing them much better and storing them for a longer period of time and, thus, in the independency of undesired changes in viscosity.

The following examples serve to illustrate the present invention, but they are not intended to limit it thereto, the parts and percentages being by weight unless stated otherwise.

EXAMPLE 1

1,100 parts of the moist 18%-press cake of triphenyl-pararosaniline-monosulfonic acid of the formula

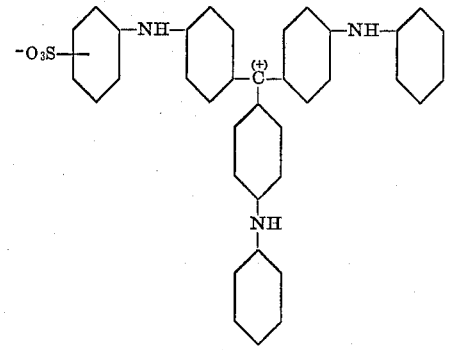

(corresponding to 200 parts of a 100%-dyestuff) were stirred in 2,000 parts of water. After 80 parts of a 48% sodium hydroxide solution had been added, the mixture was heated to 90–100° C., whereby solvent that was still present therein was distilled off. From the red solution obtained the dyestuff was again precipitated with 122 parts of concentrated hydrochloric acid, it was maintained at 90–100° C. for 15 minutes, then cooled to 55° C. and finally adjusted to a pH of from about 4 to 5 with a dilute sodium hydroxide solution. Subsequently, an emulsion consisting of 34.4 parts of blown linseed oil, 17.6 parts of a fine-cut mineral oil boiling between 300° and 330° C. and 8 parts of an emulsifier on the basis of sarcosides acylated with fatty acids in 800 parts of water was added thereto and the whole was vigorously stirred for about 15 minutes. The dyestuff was then suction filtered, washed free from salts and dried at 60° C. There were obtained about 260 parts of a 80% blue dyestuff powder which could be easily incorporated into printing varnishes, in contrast to the dyestuff dried by usual methods.

EXAMPLE 2

1,330 parts of the moist about 15%-press cake of tri-m-tolyl-pararosaniline-monosulfonic acid of the formula

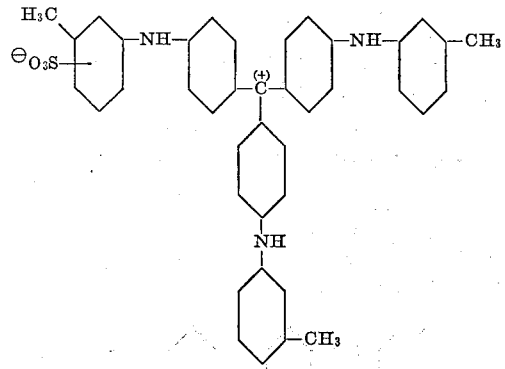

were stirred in 2,000 parts of water. After 80 parts of a 48%-sodium hydroxide solution had been added, the whole was heated to 80–90° C. until the whole dyestuff was dissolved. From the red solution obtained the dyestuff was again precipitated with 122 parts of concentrated hydrochloric acid, maintained at about 80° C. for 15 minutes, then cooled at 50° C. and finally a pH-value of about 4.5 was adjusted with a dilute sodium hydroxide solution. Subsequently, an emulsion consisting of 32 parts of blown fish oil, 20 parts of sperm oil and 8 parts of an emulsifier on the basis of a sulfated fat alcohol in 800 parts of water was added thereto and the whole was vigorously stirred for about 15 minutes. The dyestuff was then suction filtered, washed free from salts and dried at 50 to 60° C. There were obtained about 260 parts of a 80%-violet pigment powder which could be very easily incorporated into printing varnishes, in contrast to the dyestuff dried by usual methods.

EXAMPLE 3

1,000 parts of the moist about 20%-press cake of tri-p-chlorophenyl - pararosaniline - monosulfonic acid of the formula

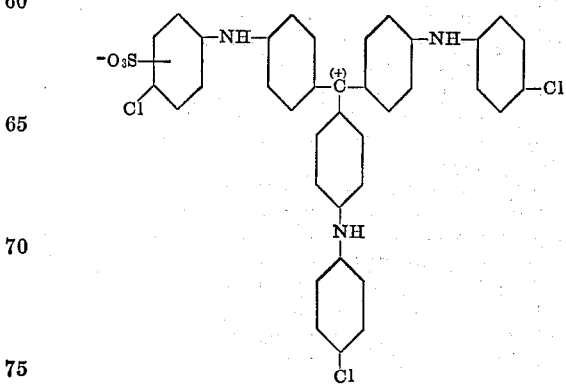

were stirred in 2,000 parts of water. After 80 parts of a 40%-sodium hydroxide solution had been added, the whole was heated to 90–95° C. until the whole dyestuff was dissolved. From the solution obtained the dyestuff was again precipitated by adding 122 parts of concentrated hydrochloric acid. Subsequently, the dyestuff was maintained at 90° C. for 15 minutes, then cooled to 50° C. and finally the pH was adjusted to a value of from 4 to 5 with a dilute sodium hydroxide solution. Then an emulsion consisting of 35 parts of sperm oil, 17 parts of an aliphatic fine-cut mineral oil boiling between 280° and 310° C. and 8 parts of an emulsifier on the basis of paraffin-sulfonate in 800 parts of water was added thereto and the whole was vigorously stirred. Finally, the dyestuff was suction filtered over a rotary filter, washed and dried at 50–60° C. There were obtained about 260 parts of a 80%-blue pigment powder which could be very easily incorporated into printing varnishes, in contrast to the dyestuff dried by usual methods.

The product yielded color-intensive greenish blue prints. The same result was obtained using, instead of tri-p-chlorophenyl-pararosaniline-monosulfonic acid, tri-p-nitrophenyl-pararosaniline-monosulfonic acid. The pigment obtained therefrom provided intensive reddish blue prints.

EXAMPLE 4

1,000 parts of a moist about 20%-press cake of tri-m-anisyl-pararosaniline-monosulfonic acid of the formula

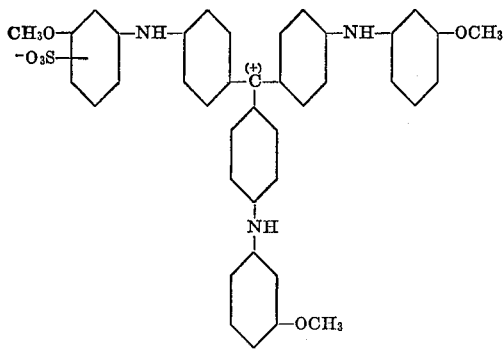

were stirred in 2,000 parts of water. 80 parts of a 40%-sodium hydroxide solution were added thereto and the whole was heated to 90–95° C. until the whole dyestuff was dissolved. From the solution obtained the dyestuff was again precipitated by adding a mineral acid, it was maintained at 90° C. for 10 minutes, then an emulsion consisting of 52 parts of an aliphatic fine-cut mineral oil boiling between 310° and 330° C. and 8 parts of an emulsifier on the basis of a sulfated secondary paraffin alcohol in 600 parts of water was added thereto, the whole was vigorously stirred and maintained at 90° C. for another 10 minutes. The mixture was then cooled to 50° C., the dyestuff suction filtered, washed with water and dried at 50–60° C. There was thus obtained a 80%-blue powder which could be very easily processed into printing dyestuffs of a high yield, in contrast to a product that was dried by usual methods.

EXAMPLE 5

200 parts of 100%-tri-p-sulfamido-pararosaniline-monosulfonic acid of the formula

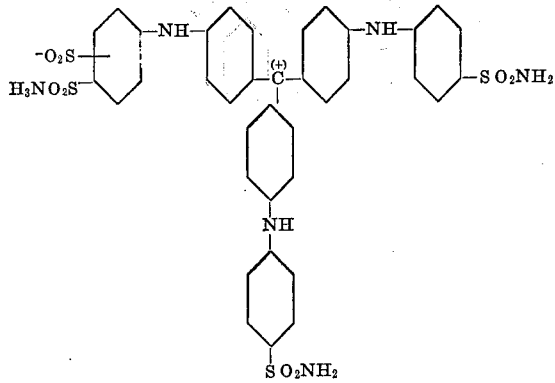

were stirred in the form of a moist press cake in 2,000 parts of water. 80 parts of a 48%-sodium hydroxide solution were added thereto and the whole was heated to 90° C. until the dyestuff had entirely entered into solution. From the solution obtained the dyestuff was again precipitated in a finely divided form by adding concentrated hydrochloric acid, it was maintained at 90–100° C. for 15 minutes, then an emulsion consisting of 26 parts of blown fish oil, 26 parts of linseed oil and 8 parts of an emulsifier on the basis of a sulfated secondary fat alcohol in 500 parts of water was added thereto, the whole was vigorously stirred and maintained at 90° C. for another 10 minutes. Subsequently, the mixture was cooled to 50° C., the dyestuff was suction filtered, washed with water and dried at 50 to 60° C. The dyestuff powder obtained could be very easily incorporated into printing varnishes. In this manner, a paste for varnish prints having an especially high tinctorial strength was obtained.

EXAMPLE 6

1,100 parts of moist 18%-press cakes of triphenyl-pararosaniline monosulfonic acid (=200 parts of 100% strength) were stirred into 2,000 parts of water, then 80 parts of a 48%-sodium hydroxide solution were added thereto, the whole was heated to 90–100° C. and solvent that was still present therein was distilled off. From the red solution thus obtained the dyestuff was again precipitated by means of 122 parts of concentrated hydrochloric acid, the temperature was maintained at 90–100° C. for 15 minutes, then reduced to 55° C. and the pH of the solution was adjusted to about 4 to 5 by means of dilute sodium hydroxide solution. Subsequently, an emulsion consisting of 34.4 parts of balsamic rosin, 17.6 parts of a fine-cut mineral oil boiling between 300 and 330° C., and 8 parts of an emulsifier on the basis of sarcosides acylated with fatty acids in 800 parts of water was added thereto and the whole was vigorously stirred for about 15 minutes. Then the product was suction filtered, washed with water until free from salts and dried at 60° C. There were obtained about 260 parts of a 80%-blue dyestuff powder that could easily be incorporated into printing varnishes in contrast to the powder dried by usual methods.

When in the above example, instead of balsamic rosin, the same amount of synthetic resin obtained by reacting 10 parts of formaldehyde with 200 parts of molten balsamic rosin was used, the same result was obtained.

We claim:
1. A process for converting aryl-pararosaniline sulfonic acids of the formula

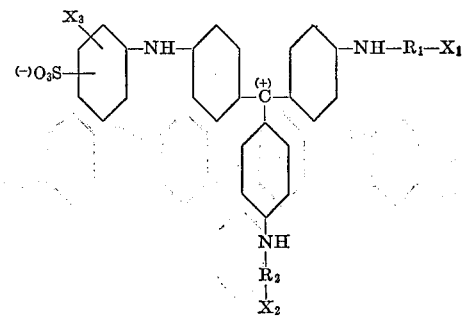

in which $R_1$ and $R_2$ are direct covalent linkages, phenylene or naphthylene, and $X_1$, $X_2$ and $X_3$ are hydrogen, chlorine, bromine, nitro, sulfonamide, alkyl having 1 to 3 carbon atoms or alkoxy having 1 to 3 carbon atoms, $X_1$ and $X_2$ being hydrogen if $R_1$ and $R_2$, respectively, are direct covalent linkages, into pigments having high tinctorial strength and soft grain and which can be dispersed easily, which comprises adding to aqueous suspensions of dyestuffs of the above formula, obtained by adding a mineral acid to aqueous alkaline solutions of said dyestuffs, aqueous emulsions of vehicles of vegetable, animal or synthetic origin, stirring the mixtures so obtained at a temperature between 60° and 100° C., separating the pigments and drying them.

2. A process as claimed in claim 1, wherein an aqueous emulsion of an unrefined, bodied or blown linseed oil is used.

3. A process as claimed in claim 1, wherein an aqueous emulsion of an unrefined, bodied or blown fish-oil is used.

4. A process as claimed in claim 1, wherein an aqueous emulsion of a mineral oil is used.

5. A process as claimed in claim 1, wherein the added aqueous emulsion contains an anionic or non-ionogenic emulsifier.

References Cited
UNITED STATES PATENTS

| | | | |
|---|---|---|---|
| 839,590 | 12/1906 | Homolka et al. | 260—392 |
| 2,009,437 | 7/1935 | Coolidge et al. | 106—308FX |
| 2,268,144 | 12/1941 | Vesce | 106—309 |
| 2,455,898 | 12/1948 | Ness | 106—308FX |
| 2,525,835 | 10/1950 | Schmutzler et al. | 106—308F |
| 3,159,498 | 12/1964 | Davis et al. | 106—308 |

TOBIAS E. LEVOW, Primary Examiner

H. M. S. SNEED, Assistant Examiner

U.S. Cl. X.R.

106—308Q, 308F, 309; 260—392